J. P. ABBOTT.
Eaves-Trough Hanger.
No. 167,422. Patented Sept. 7, 1875.
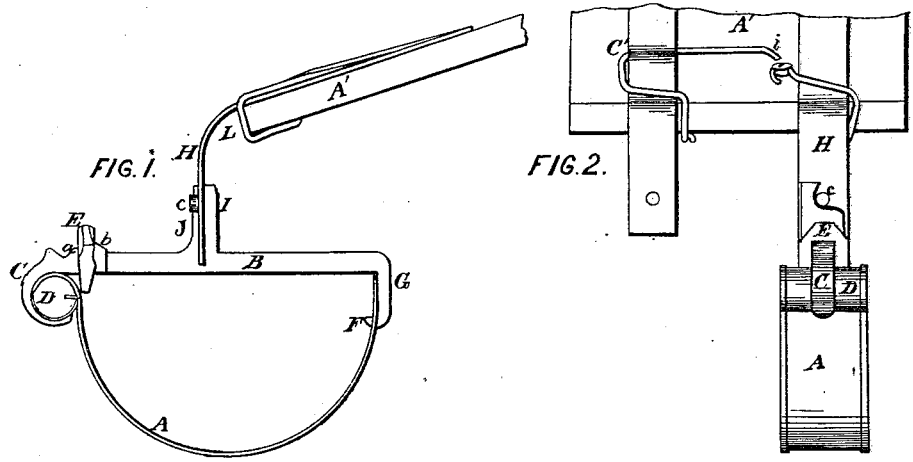
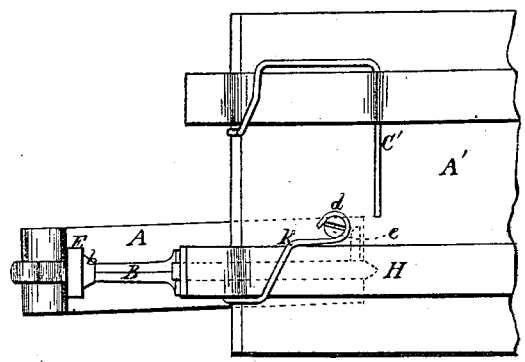
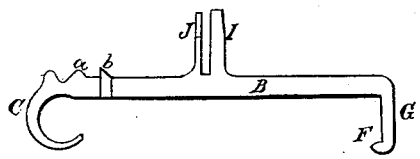
WITNESSES.
H. F. Cornell
H. C. Miller
INVENTOR.
Jonathan P. Abbott
Per. Burridge & Co.
Attys

UNITED STATES PATENT OFFICE.

JONATHAN P. ABBOTT, OF CLEVELAND, OHIO.

IMPROVEMENT IN EAVES-TROUGH HANGERS.

Specification forming part of Letters Patent No. 167,422, dated September 7, 1875; application filed March 25, 1875.

*To all whom it may concern:*

Be it known that I, JONATHAN P. ABBOTT, of Cleveland, in the county of Cuyahoga and State of Ohio, have invented a certain new Improvement in Eaves-Trough Hangers; and I do hereby declare that the following is a full, clear, and complete description thereof, reference being had to the accompanying drawings making part of the same.

Figure 1 is an end view of a trough attached to the eaves by means of the hanger herein described. Fig. 2 is a front view. Fig. 3 is a plan view. Figs. 4 and 5 are detached sections.

Like letters of reference refer to like parts in the several views.

The nature of this invention relates to a device for hanging eaves-troughs, the construction of which is substantially as follows, the same being an improvement on a similar invention patented to me January 27, 1874:

A represents a section of an eaves-trough, to which is attached a bar, B, whereby the trough is braced and suspended from the roof. Said bar is secured to the trough by a hook, C, on one end, bent around the bead D, along the outer edge thereof. Said hook suspends the outer edge of the trough, and at the same time prevents it from spreading outward. The bead D is retained in the embrace of the hook and the edge of the trough prevented from springing inward by a saddle, E, Figs. 1 and 2, placed across the bar between the collars $a$ $b$. The opposite end of the bar is secured to the inner side of the trough by a hook, F, Fig. 5, projecting horizontally from the end of the arm G depending from the end of the bar. Said hook is thrust through the side of the trough from the outside, thereby having the arm G on the outer side and the hook on the inside, as will be seen in Fig. 1. The hook, by virtue of its position, prevents the side of the trough from being pressed inward, and at the same time suspends that side of the trough, while the arm on the outside prevents the trough from spreading. The trough is suspended from the eaves by a strap, H, the lower end of which is secured to the bar B by a pin, $c$, projecting from the side of the standard I and through the end of the strap. The strap is prevented from slipping from the pin by a plate, J, which, from being made of malleable iron, can be turned up against the end of the strap, as shown in Fig. 1, thereby holding the trough from swaying transversely and from slipping from the pin. The strap is secured to the roof by a nail or screw inserted through the strap into the roof A' in the ordinary way. That part of the strap passing directly over the edge of the eaves is secured thereto by a clamp, K. Said clamp consists of a piece of wire, in one end of which is formed an eye, $d$, for the admission of a nail or screw, $e$, whereby the end of the clamp is fastened to the roof. The opposite end of the wire is bent into a square hook, L, which is made to clamp the edge of the eaves, and the strap thereon beneath it, as shown in Figs. 1 and 2, in which it will be seen that the upper end of the clamp is secured to the roof back from the eaves, and close to the side of the strap, over or across which it passes to the under side of the eaves, as will be seen in said Figs. 1 and 2.

By this clamp the strap is firmly and securely fastened to the edge of the roof, where a nail cannot well be driven, at which particular place the strap is seldom fastened, for want of sufficient material to nail to, the nailing being done farther back from the edge, where there is a greater thickness and strength of material.

In nailing the strap so far back from the edge of the roof the fastenings are very liable to become loose in consequence of the wind lifting the trough, the distance from which to the nail, being considerable, gives a play to the strap which works the nail out, and the trough comes down. This, however, cannot happen when the strap is secured by the clamp, for by it the strap is so confined that it cannot be moved by the action of the winds upon the trough.

Instead of using a nail or screw for fastening the upper end of the clamp to the roof, the end may be passed under the strap, as shown at C', Fig. 2, in which it will be seen that the extreme end of the wire is slightly bent downward and pressed into the roof. The pressure of the strap on the wire caused by the gripe of the clamp, together with the bent end $i$ slightly bedded in the roof, will prevent the end from being pulled from under the strap. Hence, while the clamp holds the strap firmly to the eaves, the strap, in return, holds the upper part of the clamp to the roof. By this reciprocal action of the clamp and the strap upon each other the trough is firmly and securely hung to the eaves of the building.

What I claim as my invention, and desire to secure by Letters Patent, is—

1. The arm G and hook F, in combination with the bar B, as and for the purpose set forth.

2. The standard I, pin c, and plate J, in combination with the bar B, as and for the purpose set forth.

3. The clamp K, having in the end thereof an eye, d, for the admission of a nail, whereby to secure the upper end of the clamp to the roof, and arranged in relation to the strap H and in combination therewith, and to the eaves of a building, in the manner substantially as described, and for the purpose set forth.

JONATHAN P. ABBOTT.

Witnesses:
J. H. BURRIDGE,
A. E. WRIGHT.